United States Patent [19]
Saleh et al.

[11] Patent Number: 5,860,274
[45] Date of Patent: Jan. 19, 1999

[54] ENERGY GUIDING CHAIN WITH GUIDING STOPS

[75] Inventors: Rolf Saleh, Niederkassel; Dirk Florian, Haan; Frank Blase, Bergisch Gladbach, all of Germany

[73] Assignee: Igus Spritzgussteile fur Die Industrie GmbH, Cologne, Germany

[21] Appl. No.: 809,187
[22] PCT Filed: Sep. 21, 1995
[86] PCT No.: PCT/DE95/01297
  § 371 Date: Jul. 30, 1997
  § 102(e) Date: Jul. 30, 1997
[87] PCT Pub. No.: WO96/09481
  PCT Pub. Date: Mar. 28, 1996

[30] Foreign Application Priority Data

Sep. 21, 1994 [DE] Germany ............ 44 33 678.0

[51] Int. Cl.⁶ ............... F16G 13/16; H02G 11/00
[52] U.S. Cl. ............... 59/78.1; 248/49; 191/126
[58] Field of Search ............... 59/78, 78.1; 248/49; 191/12 C

[56] References Cited

U.S. PATENT DOCUMENTS

| 4,462,565 | 7/1984 | Johnson | 59/78.1 |
| 5,178,247 | 1/1993 | Vagaggini | 59/78.1 |
| 5,649,415 | 7/1997 | Pea | 59/78.1 |

FOREIGN PATENT DOCUMENTS

| 1131964 | 6/1962 | Germany | 59/78.1 |
| 1474967 | 7/1970 | Germany . | |
| 2417516 | 11/1974 | Germany . | |
| 3644-848-C | 2/1988 | Germany | 59/78.1 |
| 3928236 | 10/1990 | Germany . | |
| 3-213748 | 9/1991 | Japan | 59/78.1 |

*Primary Examiner*—David Jones
*Attorney, Agent, or Firm*—Browdy and Neimark

[57] ABSTRACT

To prevent the lateral deflection of horizontally running energy guiding chains (1) sliding over one another in regions, lateral guiding stops (11) are proposed with limited freedom of movement in a plane perpendicular to the running plane of the chain.

5 Claims, 2 Drawing Sheets

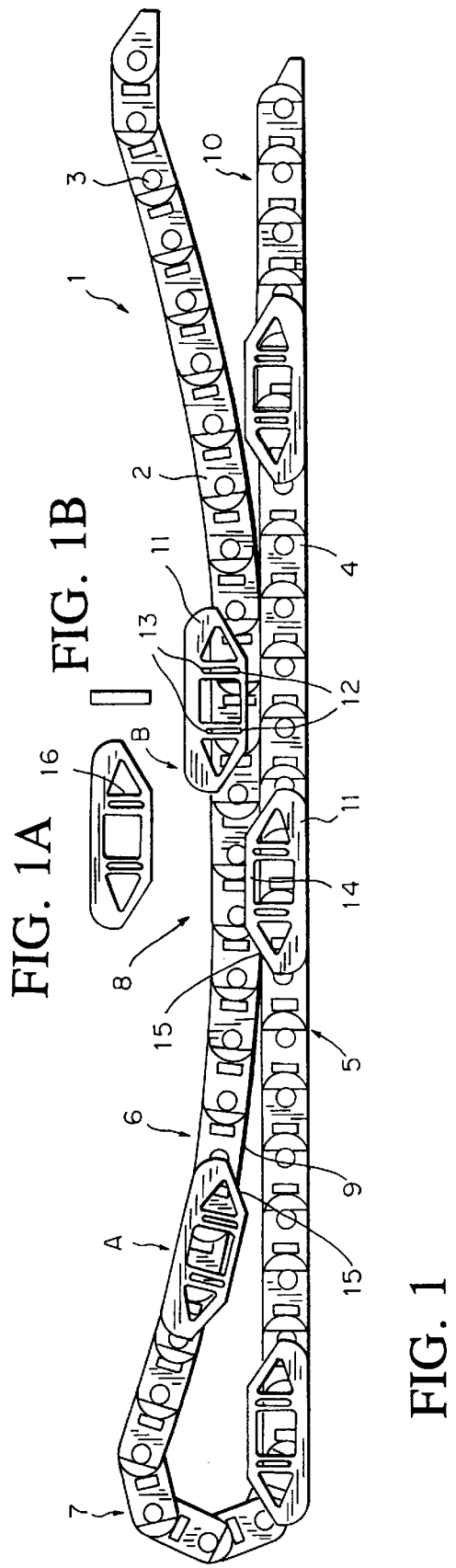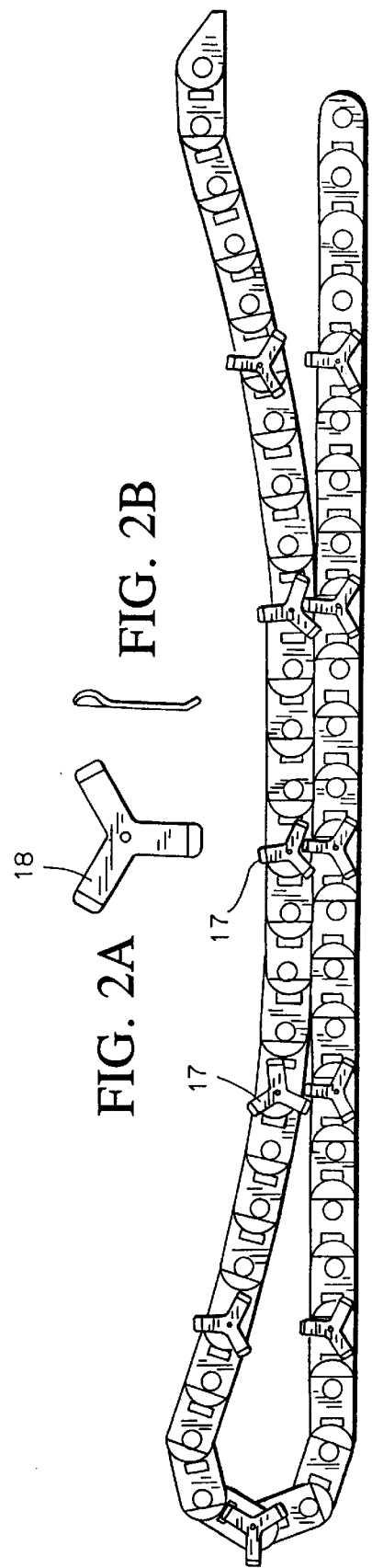

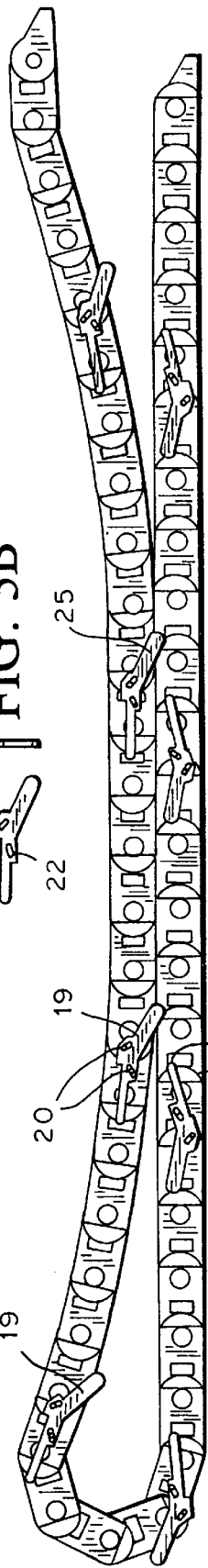
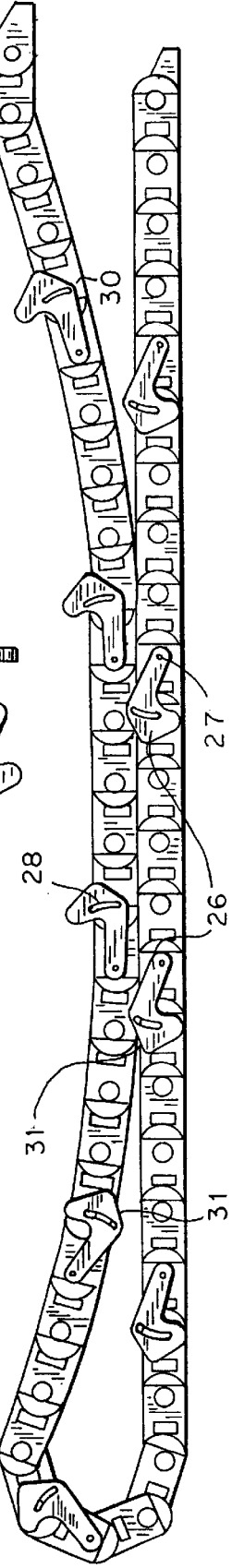

ENERGY GUIDING CHAIN WITH GUIDING STOPS

BACKGROUND OF THE INVENTION

1. Technical Field of the Invention

The invention relates to an energy guiding chain for accommodating and guiding electric cables, hydraulic hoses and the like, the chain links of which comprise side walls positioned opposite each other and cross-members, also positioned opposite each other and connecting the side walls, where the side walls of adjacent chain links are connected to each other in articulated fashion and their pivoting movement relative to each other is restricted in both directions by means of stops, and where the energy guiding chain forms a lower, roughly linear region (lower strand) when the energy consumer connected to the cables and/or hoses is operated, this being followed by an upper, sagging region (upper strand) via a deflection zone of 180°, the underside of the upper strand at least partially sliding over the top side of the lower strand.

2. Prior Art

Energy guiding chains of this type carry, guide and protect lines which move and which serve to supply power to moving machines or moving machine components.

In the case of horizontally arranged energy guiding chains, the movement of the chain forms a lower strand which can rest on a bearing surface, for example. The lower strand is followed by a deflection zone of 180°, which connects the lower strand to an upper strand. The upper strand sags and its underside slides over the top side of the lower strand, at least in regions.

In order to prevent destruction of the chain by frictional or abrasive wear as a result of the required large number of load and movement cycles, the side walls, which are of comparatively thick design, have a sliding edge which protrudes slightly beyond the cross-members, so that only these comparatively stable sliding edges are subjected to friction under normal circumstances.

However, particularly if the energy guiding chain travels over lengthy distances and if guide channels are not used, the unavoidable play in the joints of the chain links leads to lateral deviation from the straight path of the running chain, which leads to the sliding edges of the side walls of the upper strand sliding over the outer side of the lower cross members in such a way that these relatively thin components are subjected to abrasion and may possibly even be destroyed in the worst case. Furthermore, the chain can bend and tilt to the side if deflected from its straight path.

The lateral deviation also leads to increased loads on the hinge pins of the chain links, meaning that the overall service life of the energy guiding chain could be shortened.

OBJECT AND SUMMARY OF THE INVENTION

The task of the invention is to create an energy guiding chain of this type in which lateral deviations from the direction of travel are prevented and guide channels and the like can be dispensed with.

According to the invention, this task is solved in that chain links are provided with a guiding stop for the opposite strand on the outer side of at least one side wall, where the guiding stops can move to a limited extent in a plane perpendicular to the running plane of the chain.

The guiding stops according to the invention cause the side walls of the opposite strand to be overlapped in the chain region in which the upper strand slides over the lower strand, and to be guided in the direction of travel of the chain, so that lateral deflection is no longer possible in this region at least.

This gives rise to relative movement between the upper strand and the lower strand of such a kind that the stable sliding edges of the side walls slide over each other, thus restricting the resultant friction-induced abrasion to this region. Furthermore, tilting and tipping of the chain is also prevented.

In this context, it is preferable to provide the respective opposing sides of chain links with the guiding stops, where several conventional chain links without guiding stops can be positioned between the chain links with guiding stops.

Because limited movement of the guiding stops is possible in a plane perpendicular to the running plane of the chain, the guiding stops of the upper strand can be lifted by the lower guiding stops, for example, so that the guiding stops located above one another can travel past each other without the upper strand being lifted in this region.

To this end, the guiding stops expediently display straight or curved run-up bevels which cause the upper guiding stops to be gradually lifted or pivoted when the upper strand is moved.

In addition to pivoting or sliding guiding stops, rotatable guiding crosses or guiding stars can also be used, which are arranged in freely rotatable fashion on the side walls of the chain links. When the upper strand and lower strand slide against each other, this design causes the upper rotatable crosses to be turned by meshing with the lower rotatable crosses in the fashion of interlocking toothed wheels, so that the chain is again not lifted in the region of the superimposed guiding stops in this context, thus not disturbing the sliding movement.

The guiding stops can even help the upper strand to be guided on the lower strand without lateral deviations if, for example, only the guiding surfaces of the lower guiding stops laterally overlap regions of the side walls of the upper strand and the upper guiding stops are locked in a raised or pivoted position. In this context, the guiding stops of the upper strand, which slide down under the force of gravity, can be lifted or pivoted by the first guiding stop of the lower strand downstream of the deflection zone, then remaining locked in this raised position until the protruding upper surface of the guiding stops is lowered onto the base when the chain travels back, where they are forced back out of their locked position under the weight of the guiding chain.

In this way, it is ensured that only lateral guiding and/or frictional forces are exerted as regards the guiding stops, thus facilitating the movement of the chain.

In order to allow the guiding stops to be displaced or pivoted vertically, or to lock them in a raised position, the guiding stops can be attached to the side walls via guiding pins, which pass through slots with a restricted cross-section. The weight of the energy guiding chain alone is sufficient to press the guiding pins over the restricted cross-section and lock the guiding stops in the raised position. The same applies when the chain travels back, where the guiding stops are deflected through 180° and pressed out of their locked position and back into their original position by the weight of the chain when the base is contacted.

In addition to these designs of the invention, guiding stops can also be used which are attached to the side walls in the manner of a lever with two bearings, where the guiding surface in the region of the lower strand does not initially protrude above the side walls of the lower region of the chain.

However, stopping aids can pivot and lock the lever in the region of the deflection zone in such a way that, as soon as it reaches a position in the upper strand, its guiding surface protrudes down beyond the side wall, thus overlapping the side walls of the lower strand, so that the strands are again guided mutually.

When the chain returns, the lever automatically pivots back into its original position.

Guiding stops which are forced up by the weight of the chain after having passed through the deflection zone when the chain returns preferably display rounded or bevelled side edges with which they make contact with the base, so that the guiding stops can be raised without jolting.

BRIEF DESCRIPTION OF THE DRAWINGS

An example of the invention is illustrated in the drawings and in detail below on the basis of the drawings. The drawings show the following:

FIG. 1 An energy guiding chain comprising a lower strand, a deflection zone and an upper strand, the side walls of which are provided with guiding stops which can be raised and locked in a raised position, FIGS. 1A and 1B show a separate and side view of the guiding stop 11 in FIG. 1.

FIG. 2 A guiding chain as per FIG. 1 with guiding stops designed as three-armed rotating stars, FIGS. 2A and 2B show a separate and side view of the star-shaped cross guiding stop 17 in FIG. 2.

FIG. 3 An energy guiding chain as per FIG. 1 or 2 with guiding stops designed as levers mounted in two bearings, FIGS. 3A and 3B show separate and side views of the pivoting lever 19 in FIG. 3.

FIG. 4 An energy guiding chain as per FIGS. 1 to 3 with upward-pivoting, anchor-like guiding stops.

FIGS. 4A and 4B show separate and side views of the pin 28 in FIG. 4.

DETAILED DESCRIPTION

The energy guiding chain 1 depicted in FIGS. 1 to 4 comprises numerous chain links 2, the ends of which are connected to each other via hinge pins 3 in such a way that they can be pivoted to engaged to energy supply means within the guiding chain a limited extent. The chain links 2 comprise side walls 4, of which only the front side walls 4 can be recognised on account of the side view. The opposing side walls 4 are connected to each other by upper and lower cross-members, which are likewise not visible in the drawings.

As shown in FIG. 1, the energy guiding chain 1 when in use comprises a lower strand 5 and a moving upper strand 6, which is joined to the lower strand 5 by means of a deflection zone 7 of 180°. The length of the upper strand 6 and the lower strand 5 is dependent on the position of the moving energy consumer (not shown). The underside 9 of the upper strand 6 slides over the top side 10 of the lower strand 5 in a middle region 8. Slide-like guiding stops 11 are provided on the side walls 4 of the chain links 2 arranged at intervals from each other, and attached to the respective side walls 4 by means of two guiding pins 12. The guiding pins 12 pass through two slots 13, so that the guiding stops 11 can be moved and/or displaced to a limited extent in the vertical plane perpendicular to the direction of travel of the energy guiding chain 1.

The guiding stops located in the region of the lower strand 5, which rests on a base not depicted in the drawings, protrude upwards beyond the side walls 4 of the lower strand 5 with a guiding surface 14 and thus guide the upper strand 6 in the middle region 8.

After passing through the deflection zone 7, lower strand 5 becomes the upper strand 6 and the guiding stop 11 drops down under the force of gravity and assumes the position depicted according to Item A. As the upper strand 6 continues to travel, the run-up bevels 15 of the upper and lower guiding stop come into contact with each other, the upper guiding stop being raised and forced into a position according to Item B. Once in position B, it is locked in place by the restricted cross-sections 16 of the slots 13.

In this way, the guiding stops 11 of the upper strand 6 can easily pass the guiding stops 11 of the lower strand 5, without the energy guiding chain 1 being raised in this region or the relative movement of the strands being disturbed.

The guiding stop depicted in FIG. 2 is designed as a star-shaped cross 17 mounted in rotating fashion with three arms 18.

When the upper strand 6 slides over the lower strand 5, the star-shaped crosses 16 interlock with each other in the manner of toothed wheels, so that the upper star-shaped crosses 17 are turned away in a clockwise direction, thus meaning that, in this design too, the guiding stops can also travel past each other without raising the chain in the middle region 8.

In the configuration according to FIG. 3, the guiding stops 11 are designed as pivoting levers 19 mounted in two bearings, where the bearings take the form of pins 20 which pass through two curved slots 21, 22.

Stops 23, 24 pivot the pivoting levers 19 in the deflection zone 7 in such a way that, in the region of the upper strand 6, their guiding surfaces 25 overlap the side walls 4 of the lower strand 5, thus providing mutual guidance.

In the practical example likewise depicted in a side view in FIG. 4, the guiding stops 11 comprise anchor-like levers 26 mounted in pivoting fashion, which are attached to the side walls 4 of the chain links 2 by means of a pivoting pin 27, and whose pivoting motion is restricted by a pin 28 which passes through a curved slot 29 in the lever 26.

In turn, the slot 29 displays a restricted cross-section 30 which locks the lever 26 in the raised position in the region of the upper strand 6. Run-up bevels 31, which interact in the manner of the run-up bevels 15 of the guiding stops 11 depicted in FIG. 1, serve to raise the levers 26 in the region of the upper strand 6.

REFERENCE NUMBERS

1 Energy guiding chain
2 Chain link
3 Hinge pin
4 Side wall
5 Lower strand
6 Upper strand
7 Deflection zone
8 Middle region
9 Underside
10 Top side
11 Slide-like guiding stop
12 Guiding pin
13 Slot
14 Guiding surface
15 Run-up bevel
16 Restricted cross-section 17 Star-shaped cross
18 Arm
19 Pivoting lever
20 Pin
21 Slot
22 Slot
23 Stop
24 Stop
25 Guiding surface
26 Anchor-shaped lever
27 Rotating pin
28 Pin
29 Slot
30 Restricted cross-section
31 Run-up bevel

What is claimed is:

1. Energy guiding chain for accommodating and guiding elongated energy supply means engaged to a movable energy consumer for supplying energy, said side chain comprising a plurality of chain links each having walls positioned opposite each other and cross-members, also positioned opposite each other and connecting the side walls, wherein the side walls of adjacent chain links are connected to each other in articulated fashion and their pivoting movement relative to each other is restricted in both directions by means of stops and where the energy guiding chain forms a lower strand having a roughly linear region on ground below the chain when the energy consumer connected to the energy supply means is operated, the lower strand being followed by an upper strand having a sagging region starting from a deflection zone of 180° located between the lower strand and the upper strand, the underside of the upper strand at least partially sliding over a top side of the lower strand, wherein said chain links (2) are provided with a guiding stop (11, 17, 19, 26) on an outer side of at least one side wall (4), where the guiding stops (11, 17, 19, 26) can move to a limited extent in a plane perpendicular to a running plane of the chain (1).

2. The energy guiding chain according to claim 1, wherein a guiding surface (14, 25) of the guiding stops (11, 17, 26) protrudes above a top side (10) of the chain links (2) in the linear region of the lower strand (5) and below an underside (9) of the chain links (2) in the sagging region of the upper strand (6).

3. The energy according to claim 1, wherein the guiding stops (11, 26) have straight or curved run-up bevels (15, 31), where the run-upbevels (15, 31) of the guiding stops (1l, 26) of the upper strand (6) interact with the run-up bevels (15, 31) of the guiding stops (11, 26) of the lower strand (5) in such a way that the guiding stops (11, 17, 26) of the upper strand (6) are turned, pivoted upwards or forced upwards.

4. The energy according to claim 3, wherein the guiding stops (11, 26) of the upper strand (6) can be locked in a releasesble manner in an upper position.

5. The Energy guiding chain according to claim 1, wherein the energy supply means includes electric cables and hydraulic hoses.

* * * * *